(12) United States Patent
Hahn et al.

(10) Patent No.: US 9,795,077 B2
(45) Date of Patent: Oct. 24, 2017

(54) ROW UNIT WITH TRACKS

(71) Applicant: KINZE MANUFACTURING, INC., Williamsburg, IA (US)

(72) Inventors: Dustan Hahn, Williamsburg, IA (US); Matthew J. Wilhelmi, Parnell, IA (US); Susanne Veatch, Williamsburg, IA (US); Rhett Schildroth, North Liberty, IA (US); Robert Blackwell, Coralville, IA (US); Michael J. Myers, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 103 days.

(21) Appl. No.: 14/751,716

(22) Filed: Jun. 26, 2015

(65) Prior Publication Data

US 2015/0373904 A1 Dec. 31, 2015

Related U.S. Application Data

(60) Provisional application No. 62/018,140, filed on Jun. 27, 2014.

(51) Int. Cl.
| | |
|---|---|
| *A01C 5/06* | (2006.01) |
| *A01C 7/20* | (2006.01) |
| *A01C 19/00* | (2006.01) |
| *A01C 7/12* | (2006.01) |

(52) U.S. Cl.
CPC ............... *A01C 7/12* (2013.01); *A01C 5/066* (2013.01); *A01C 7/203* (2013.01); *A01C 19/00* (2013.01); *A01C 5/064* (2013.01)

(58) Field of Classification Search
CPC .. A01C 5/066; A01C 5/06; A01C 5/00; A01C 7/203; A01C 7/201; A01C 7/20; A01C 19/00; A01C 7/12; A01C 7/08; A01C 7/00; A01C 5/064; A01C 5/062
See application file for complete search history.

(56) References Cited

U.S. PATENT DOCUMENTS

| | | | |
|---|---|---|---|
| 2,509,691 A | 5/1950 | McLemore | |
| 2,981,213 A * | 4/1961 | O'Neil | A01C 7/08 111/134 |
| 5,058,766 A | 10/1991 | Deckler | |

(Continued)

OTHER PUBLICATIONS

United States Patent & Trademark Office, "International Search Report", issued in connection to International Application No. PCT/US2015/37972, mailed on Sep. 29, 2015, 7 pages.

*Primary Examiner* — Christopher J Novosad
(74) *Attorney, Agent, or Firm* — McKee, Voorhees & Sease, PLC

(57) ABSTRACT

An agricultural planter includes a plurality of row units attached thereto for planting seed in a field. The row units include a seed meter for singulating and dispensing seed. Opening wheels or discs are included to create an opening in the field, such as a furrow. The row unit can include one or more continuous tracks for supporting the row unit as it moves through the field. The tracks reduce compaction around the created furrow and provide better control of seed depth placement. Furthermore, one or more cylinders may be provided that control the depth of furrow being created to also control the depth at which the seed is deposited.

20 Claims, 13 Drawing Sheets

(56) References Cited

U.S. PATENT DOCUMENTS

| | | | | |
|---|---|---|---|---|
| 6,148,746 | A | * | 11/2000 | Kopycinski .......... A01C 23/024 111/119 |
| 2004/0235600 | A1 | * | 11/2004 | Piou .................... B62D 55/244 474/262 |
| 2007/0095261 | A1 | | 5/2007 | Mariman et al. |
| 2009/0033147 | A1 | * | 2/2009 | Riedinger .............. B62D 55/00 305/135 |
| 2013/0032362 | A1 | * | 2/2013 | Rylander ................ A01C 7/205 172/1 |
| 2013/0112122 | A1 | * | 5/2013 | Blomme ................ A01C 5/062 111/149 |
| 2014/0000919 | A1 | | 1/2014 | Bachman et al. |

* cited by examiner

ROW UNIT WITH TRACKS

CROSS-REFERENCE TO RELATED APPLICATIONS

This application claims priority under 35 U.S.C. §119 to provisional application Ser. No. 62/018,140, filed Jun. 27, 2014, herein incorporated by reference in its entirety.

FIELD OF THE INVENTION

The invention relates generally to agricultural implements. More particularly, but not exclusively, the invention relates to row units of agricultural planters that include the use of tracks in place of wheels.

BACKGROUND OF THE INVENTION

An agricultural row crop planter is a machine built for precisely distributing seed into the ground. The row crop planter generally includes a horizontal toolbar fixed to a hitch assembly for towing behind a tractor. Row units are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow. Wheels of the row units aid in the movement of the unit, and also act as closing devices to cover seed that is deposited into formed trenches for planting.

It is desirable to maximize crop yield to place seed in the ground at specified intervals and depth. Seed metering and sewing systems strive to do this today but are have inherent inaccuracy for a number of reasons. The sewing unit opens a trench with splayed disks pushed into the ground at the desire depth that the seed is to be buried. The trench is then packed by wheels and other devices. Inherent to the processes and apparatus, variation in soils type and moisture exist, and the seed trench depth can vary significantly. Because the seed is dropped from a metering device through a tube into an open trench from a moving tractor and then covered with soil, the position of the seed can vary significantly. The seed spacing interval as defined can also vary significantly because the sewing unit speed moving over the ground is calculated from tractor movement and planter geometry and can vary significantly in turns and other maneuvers.

Furthermore, because the seed meter may be bouncing erratically through the field, the seed can tumble through the seed tube striking it one or more times, particularly if the sewing unit is tilted on a hill and moving on rough terrain. The seed will tumble as it falls in the irregular trench in whatever orientation it happens to land before it is covered with soil. If the seed is not in the bottom of the trench it will move as the trench is closed with filling soil.

Therefore, there is a need in the art for overcoming problems associated with attempting to plant seed at a desired depth and with desired spacing intervals.

SUMMARY OF THE INVENTION

Therefore, it is a primary object, feature, and/or advantage of the invention to overcome or improve on the deficiencies in the art.

According to some aspects of the invention, a planter for planting seed is provided. The planter includes a toolbar and a plurality of row units operatively attached to the toolbar. The row units comprise opening wheels or discs for creating an opening in the ground, a seed meter for dispensing seed adjacent the opening wheels or discs for dispensing seed into the opening in the ground, and tracks positioned at least partially outside the opening wheels or discs. The tracks are configured to aid in moving the planter and closing the opening in the ground after the seed has been dispensed therein.

A tracked vehicle runs on continuous tracks instead of wheels. An advantage of the tracked wheels is that, because tracks are in contact with a larger surface area than a wheeled vehicle, they exert a much lower force per area on the ground. This makes them suitable for use on soft, low friction, and uneven ground, such as tilled and wet soils. A characteristic of wheels and tracks is that while they turn or roll to move a vehicle the physical area that contacts the ground, often called the contact area, and has no relative velocity or movement with the ground. For a rolling wheel this contact patch may be very small and the time that contact area has no relative velocity with the ground is very small. For a track, the contact patch is much larger and the time that a particular point along the track has no relative velocity with the ground is much larger. Using this principle, if sequence of holes exist through and along a rolling track at a desired seed spacing, and a seed delivery probe and mechanism is mounted on the inside of the track pointing outwardly through the hole, then a portion of the track with a hole in it contacts the ground and there is no longer any relative movement between the ground and segment of track.

During this time of no relative movement, a seed delivery probe can be extended through the hole in the track and into the ground until it achieved its desired depth at which point it will release the seed. The probe mechanism will then extract the probe before that portion of the track loses contact with the ground. The seed probe mechanism can be actuated in a number of ways: as a follower with a cam mounted on the moving part of the track, or with an electric solenoid, hydraulic or pneumatic cylinder. The probe while retracting fills the probe hole by compressing down on the soil around the circumference of probe and pushing into the hole. The seed is metered conventionally but is mechanically place into or on the placement probe. The invention can be employed by having multiple tracked sowing units mounted to a conventional planter or built into a multi-track vehicle driven by a human or autonomous vehicle.

Often soil is prepared with implements before a trench is opened with current sowing units. While the soil may be prepared in front of the disclosed device it does not have to be nor does a trench need to be opened or prepared for seed delivery. With the invention, the seed delivery vehicle is moved with tracks, which inherently operate better in rough and wet conditions than a wheeled device. The seed is positioned and placed in the soil by the probe not dropped from a moving vehicle on irregular terrain, through an irregularly shape tube, into a stationary but irregularly shaped trench, and then moved again from dirt piling into the open trench.

According to additional aspects, a standard seed metering system can be used with the row unit including tracks instead of wheels. The row unit will include opening wheels or discs, which may be in front of or behind the planter toolbar. Having the opening wheels or discs in front of the toolbar can aid in reducing the width of the machine in a folded transport configuration and will also place the weight of the toolbar that needs to be transferred to the row unit directly above it, which can reduce the amount of downforce required for each row unit.

In such a configuration, the row unit would include a metering system that has a lowered seed meter, potentially just above the ground and positioned adjacent and/or behind the opening wheels or discs. A seed tube or chute can be used to provide an even lower deposit point of the seed into the trench formed by the opening wheels or discs. Having the lowered seed meter and seed tube will decrease the amount of bounce on the seed as it is being planted, which should increase the spacing interval and depth of the seeds being planted, which as noted, will aid in increasing crop yield.

In any embodiment, the tracks may be driven by the speed of the tractor pulling the planting implement, or they may be independently controlled with the use of motors at each of the row units. The independent control of the row units would allow for greater control for planting, turning, etc. In such a situation, the speed of the tracks could be aligned or determined through a control system that determines the speed of the tractor, desired seed spacing, soil conditions, etc., so that the planting implement will move through the field and plant to best optimize the yield.

Figure 1:
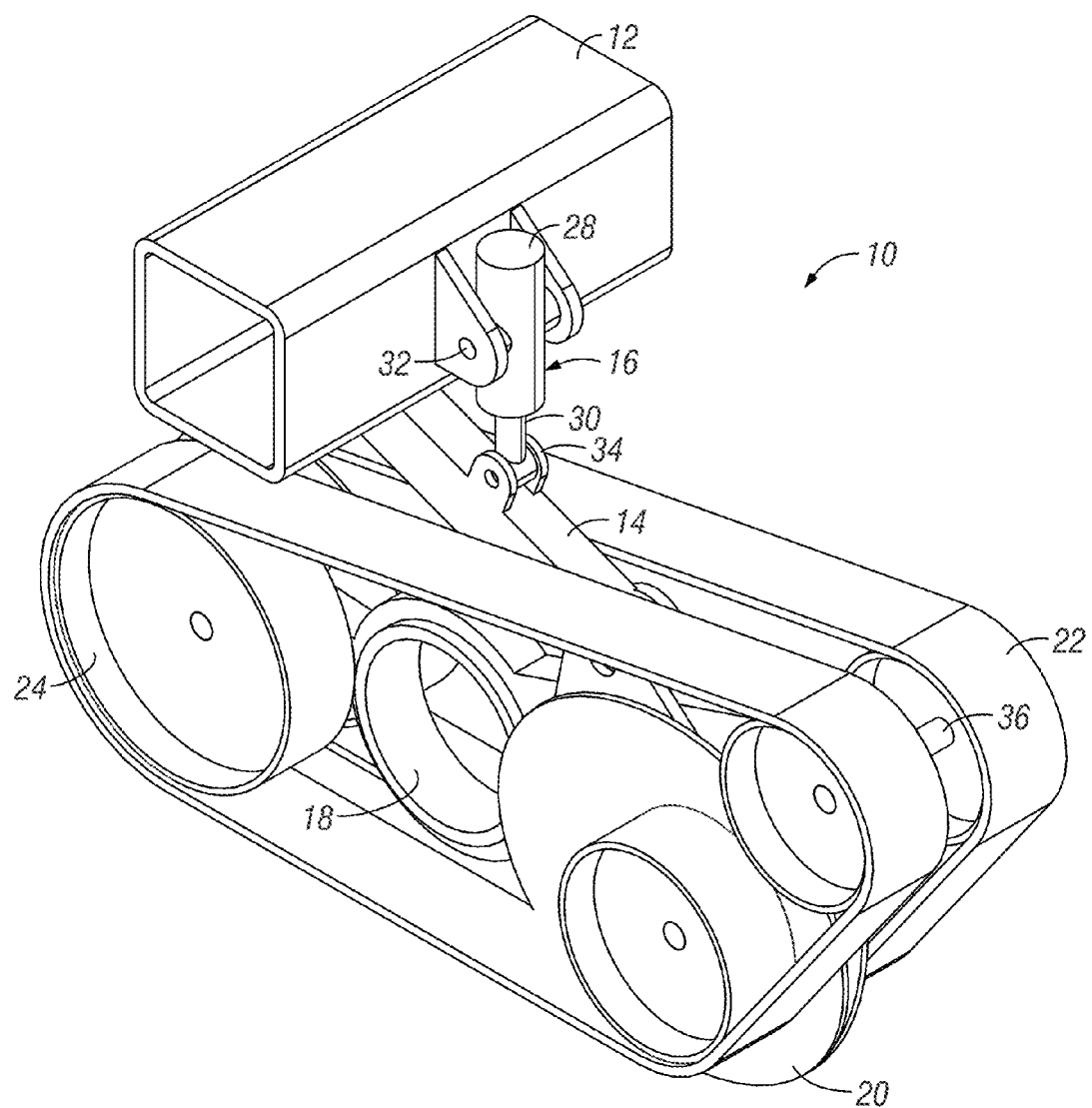
FIG. 1 is a perspective view of a row unit attached to a portion of a planter toolbar, according to some aspects of the invention.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE EMBODIMENTS

The invention relates generally to row units for use with a planting implement, such as an agricultural planter. Planters are generally attached to or pulled by a tractor or another agricultural vehicle. Most planters include a tongue having a first end including a hitch and an opposite second end. The second end of the hitch may include or otherwise be connected to a central toolbar. The tongue may be telescoping in nature such that it can extend and retract in length, or can be otherwise configured such that it is rear folding or non-folding, as is known in agricultural industry. As will be appreciated, the row units of the invention can be used with generally any and all types of planters. Extending from sides of the toolbar may be first and second wings. The wings are generally identical to one another and may be mirror images of one another. The wings include toolbars as well. Mounted to the main toolbar and/or wing toolbars are a plurality of row units, which are configured for planting of one or more types of seeds. For example, the row unit may include hoppers, or other seed delivery systems, such as air seed delivery systems, to provide seed from a central or bulk hopper. The seed is then metered at the row unit, and is placed in a trench created by opening wheels, shanks, hoes, and/or discs. The trench is then closed or otherwise soil is moved to cover the trench, thus planting the seed.

The row unit and components thereof are key to optimize the planting of the one or more types of seeds in the field. For example, to maximize crop yield, individual seed and/or types of seed may grow best when planted at optimal depth and with optimal spacing between each seed. Therefore, a job of the seed meter of the row unit is to dispense, deposit, or otherwise move the seed into the formed trench, which is ideally formed at the preferred depth in such a way that the seeds are spaced from one another at an ideal distance to optimize growing conditions, seed types, and otherwise to increase and/or maximize the crop yield. The figures of the invention show and provide embodiments and/or aspects of novel row units for use with agricultural planters. The row units, as will be shown and described, include aspects that aid in optimizing the planting depth and spacing of seed as a planter moves through the field in order to maximize the yield obtained by the harvested crop. As will be understood, the row units of the invention provide numerous advantages over existing planters.

FIGS. 1-6 show a row unit 10 according to some embodiments and/or aspects of the invention. It should be noted that the row unit 10 shown in the figures does not include wheels, such as transport wheels and/or gauge wheels that are traditionally found on standard row units. Instead, the row unit 10 shown in the figures includes continuous tracks 22 for use in moving the row unit through the field, by transport, and the like. The continuous tracks, as will be understood, provide numerous advantages over the use of wheels, including, but not limiting to aiding and providing the optimized planting conditions for planting different types of seeds. The tracks could be shaped to mold the shape of the opened trench for improved closing of the trench. Furthermore, the tracks can increase the smoothness of the ride, which will reduce vibration, which will improve seed drop. Still other advantages includes lowered compaction around the furrow when compared to standard row units with wheels, as well as better seed depth control in planting seeds via the row unit.

Therefore, as shown in the figures, a row unit 10 is provided. The row unit 10 may be one of a plurality of row units that are found on an agricultural planter (not shown). For purposes of disclosure, only one row unit 10 of the plurality of row units of the planter will be shown and described, and it should be appreciated that the additional row units will be identical or nearly identical in configuration to the row unit shown in FIGS. 1-6.

The row unit 10 is operatively attached to one of the toolbars 12 of the planter. As previously noted, the planter may include a central toolbar and/or wing toolbars extending from the central toolbar. The row unit 10 can be attached to any toolbar of the planter. The row unit 10 includes a frame 14 that is attached to the toolbar 12. The frame may be a metal or other rigid material capable of withstanding the forces acting on the planter row unit 10, and which can also support the weight of the row unit. The frame 14 may be attached to the toolbar 12 at a connecting member 26, which may be a pin. As is shown best in FIG. 2, the frame 14 is pivotally connected to the toolbar 12 at the connecting member 26, such that the frame 14 is able to rotate relative to the toolbar 12. Such rotation will allow the row unit 10 to be adjusted as the row unit 10 and planter are moved through a field and experience changing conditions, such as soil conditions, pitch, elevation changes, and the like.

Also shown extending between the toolbar 12 and the frame 14 is a downforce cylinder 16. The downforce cylinder 16 includes a housing 28 and a rod 30. As is known, the rod 30 is able to extend and retract relative to the housing 28. The downforce cylinder 16 may be a hydraulic cylinder, pneumatic cylinder, electric actuator, and/or some combination thereof. It should be appreciated that the type of downforce cylinder need not be particularly important to the configuration of the row unit, except that the downforce cylinder 16 be able to provide an sufficient downforce to the row unit 10 such that the planting conditions (e.g., depth, load, etc.) be maintained or nearly maintained throughout the ever changing conditions of a field. The cylinder 16 includes a mount 32 to allow the cylinder 16 to be pivotally and/or rotatably connected to the toolbar 12. The rod 30 is connected to the frame 14 at a mount 34, which is a pivoting mount as well. The cylinder 16 may be connected at both locations by pins, for example. Therefore, the cylinder 16 is able to rotate relative both to and at the toolbar 12 and as well to and at the frame 14. This will allow the cylinder 16 to provide a downforce to the row unit 10 at differing angles. In addition, as the cylinder 16 is able to rotate relative to the frame 14 and toolbar 12, the force provided by the cylinder 16 will be maintained in a generally downward direction as opposed to a lateral direction. Examples of such downforce providing cylinders may be found in U.S. application Ser. No. 13/457,815, as well as U.S. Application No. 61/968,820, both of which are herein incorporated by reference in their entirety. Furthermore, it should be appreciated that other types of cylinders not herein described or disclosed or incorporated may be included as well. For example, a strut type mechanism may be used to replace the downforce cylinder 16. Other types of mechanisms, such as compressible or non-compressible fluids may also be used to maintain a certain downforce on the row unit 10.

Figure 6:
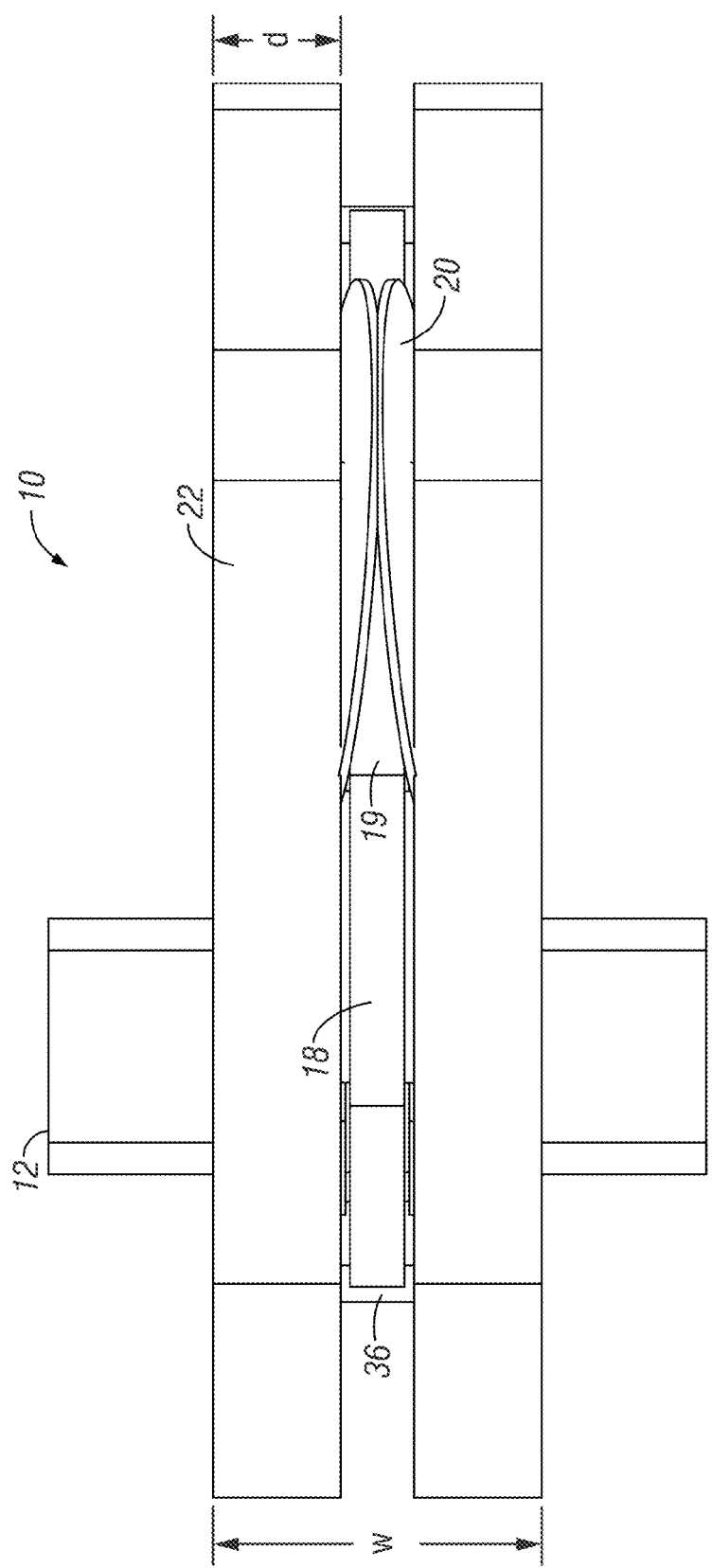
FIG. 6 is a bottom view of the row unit of FIG. 1.

At an opposite end of the frame 14 may be positioned a seed meter 18, which is positioned at least partially behind a pair of opener disks 20. The opener disks 20, as shown through the figures, are angled relative towards one another, and may also be known as coulter disks. For example, as shown from the front in FIG. 2, the opener disks 20 are angled towards each other at the front, while as shown in FIG. 6, the opener disks are angled away from each other at the rear. This allows the opener disks to create a trench in soil as the planter is moved through a field by a tractor. The angle of the opener disks 20 will provide the width of the trench created by the opener disks. Furthermore, the depth of the trench can be determined by the depth of the opener disks in the soil. For example, as described with regard to the downforce cylinder 16, the depth of the opener disks, and thus trench created thereby, can be adjusted by an increase in the amount of downforce provided by the cylinder 16. Extending the rod 30 can move the frame downward, which will in turn move or push the opener disks 20 further into the soil, thus creating a deeper trench. However, as will be understood, the opener disks are not required in all aspects of the invention and other ways of adjusting the depth without the use of the cylinder may be provided. Furthermore, other components besides wheels could be used to create the furrow in which the seed is deposited.

Positioned generally adjacent the opener disks 20 and in some embodiments directly behind the opener disks is a seed meter 18. The seed meter 18 can be a standard meter, such as one disclosed in U.S. application Ser. No. 13/829,726, which is herein incorporated by reference in its entirety. For example, the seed meter 18 can include a meter housing for housing a seed disc therein. Seed is provided to the seed meter, such as by a seed tank at the row unit, or such as by some seed delivery system to the seed meter of the row unit. For example, an air seed delivery system can deliver seed from a central or bulk hopper of the planter to each row units on an as needed basis. However, it should be appreciated that a type of delivery system for seed to the seed meter 18 of each of the row units of the invention are not to be limiting to said invention. Furthermore, it is contemplated that the seed meter be a multi-hybrid type seed meter that is capable of planting one of a plurality of types, varieties, and/or hybrids of seed, with the seed changing as the planter moves through the field. Such seed meters are disclosed in U.S. application Ser. No. 14/478,222, hereby incorporated by reference in its entirety.

In addition, the seed meter 18 may include a singulating device housed within the meter housing. The singulating device works with the seed disc to provide that a single seed is positioned at each seed aperture on the seed disc. This will increase the efficiency of planting such that only one seed will be planted at a time. Furthermore, it should be appreciated that the seed meter may be mechanical (e.g., chain driven, ground driven, finger type, brush type, or some combination thereof) or an air seed meter, such as a vacuum or positive pressure meter. When an air seed meter is used, the air pressure is provided to the meter, such as by an air hose or an individual vacuum or other air source at the row unit itself. This invention is not to be limited to a particular type of seed meter.

Figure 5:
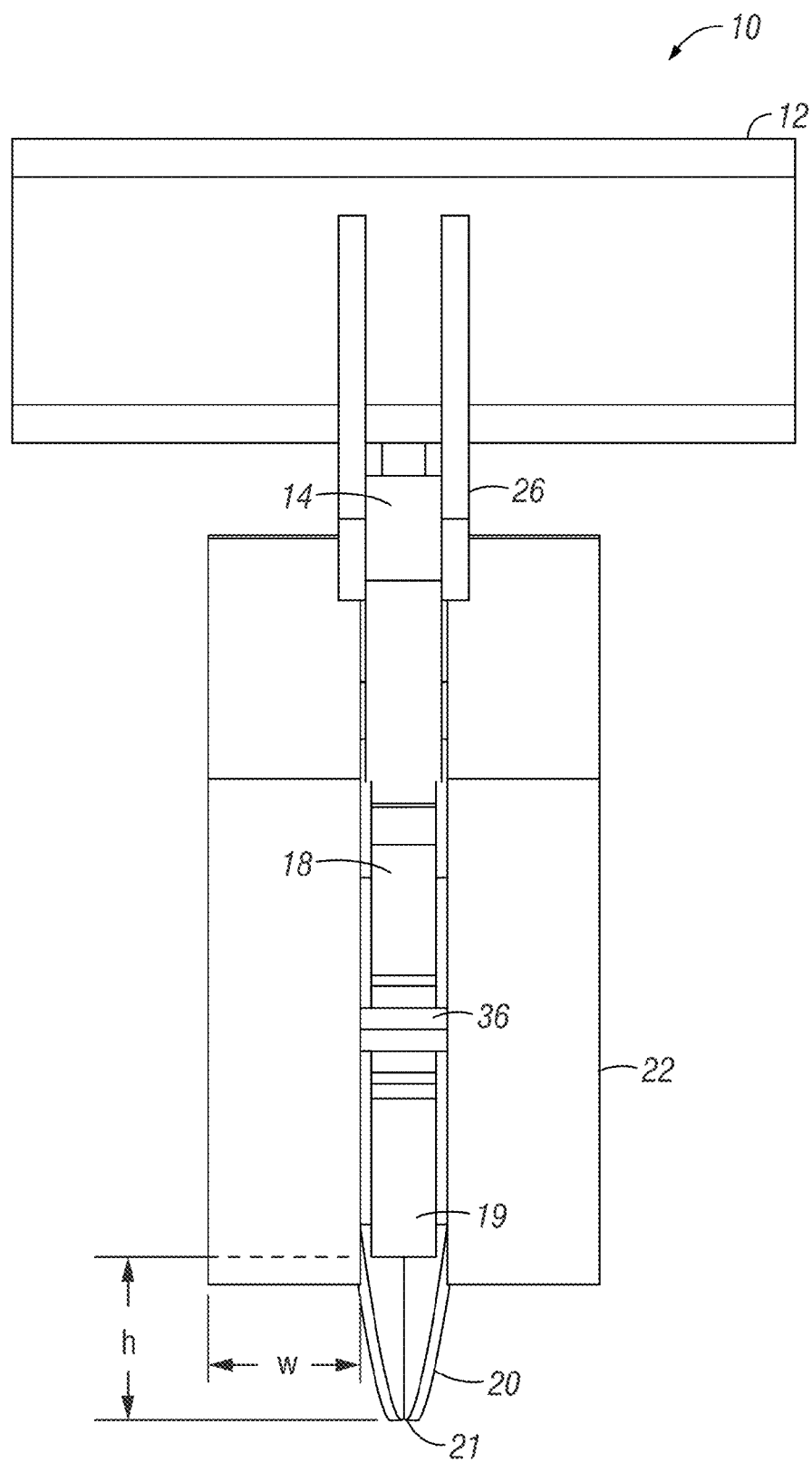
FIG. 5 is a rear elevation view of the row unit of FIG. 1.

Positioning the seed meter 18 adjacent to and/or directly behind the opener disks 20 will provide numerous advantages. For example, problems exist when the seed meter is positioned at or near the toolbar or otherwise positioned higher above the ground. The seed has to go undergo some drop from the release point from the seed meter to the trench. During this drop or free fall, the seed can experience outside forces, such as jostling, bouncing in a seed tube, or the like. This can affect the timing of the seed into the trench, as well as the placement of the seed into the trench, which can affect the seed spacing between adjacent seeds. The problem can be greater when on a hill or other angled area. Therefore, as shown in the figures, the seed meter positioned generally adjacent the ground and directly rearward of the opener disks will eliminate and/or mitigate some of the previous issues. As the seed has a very short distance between its release point 19, as shown in FIG. 5, and the bottom of the trench 21, as shown in FIG. 5, there will be fewer chances for outside conditions to affect the drop of the seed. For example, as shown in FIG. 5, the distance, which is noted by the small "h", is relatively small when compared to standard row units. Therefore, once the seed has been singulated in the seed meter, its release point will be at a point where there will be little to no outside forces acting on the seed before it reaches the bottom of the trench. This will vastly improve seed spacing efficiency, as well as mitigating any bounce or roll the seed may have in the formed trench. Other benefits obvious to those skilled in the art are considered to be included with the lowered placement of the seed meter on the row unit 10.

Furthermore, it is noted that, while the standard row units include wheels, such as gauge wheels for closing the trench formed by the opener disks; this has proven to be disadvantageous, at least in some instances. For example, the wheels have a small surface area in contact with the ground, such that the amount of weight on said small surface area of wheel on the ground is great. This can cause the soil to be compacted more than what is desired for planting, closing the trench, or otherwise moving through a field. Therefore, an aspect of the invention includes the replacement of wheels on the row unit with continuous tracks 22. The tracks 22, as shown in the figures, may be rubber or any other material. The tracks will provide less ground pressure because the tracks include a greater surface area in contact with the ground at a specific time. As noted, at a specific moment in time, wheels have a small surface area in contact with the ground. This causes all the weight to be on that small surface area. Spreading the weight over a larger surface area will decrease the amount of pressure felt over the full surface area, which will decrease the compaction and pressure on the ground at the particular moment in time.

The continuous tracks provide additional advantages as well. For example, continuous tracks have greater power efficiency, such as high performance and optimized tracking system. The traction of the continuous tracks is high even on slippery surfaces such as mud, snow, and other environments. The use of continuous tracks allows the row units to operate better on rough terrain, which can cause a greater amount of movement and/or higher forces on the wheels and thus, planter. The treads of the continuous tracks will be able to allow the row unit to move easier through said rough terrains. As mentioned, there is less pressure or ground impact with the use of the continuous tracks when compared to wheels. This is due to the greater surface area that the weight of the row unit is able to spread over the length of the continuous track. Another advantage is the extended period of time that the soil in contained or restrained underneath the track profile. This containment of the soil helps to reduce 'rooster tailing' in high speed situations, and also helps to hold field debris in place while the opener disks cut through it, and holds it in place until the seed has been placed in the trench and covered. There is also the opportunity for better maneuverability with the use of continuous tracks. Still other advantages, benefits, and the like will be apparent by the use of continuous tracks with respect to the replacement of wheels.

As shown in the figures, the continuous tracks are mounted on a plurality of rollers 24, which space the tracks, move the tracks, and provide the amount of surface area of the track in contact with the ground at a specific moment in time. The rollers 24 of the tracks may include mirrored placement between the pair of tracks such that the rollers 24 are connected by axles 36, which can provide for the rollers to move the tracks at the same or similar velocities. However, in some embodiments, the rollers may include individual control for each separate track on each side of the row unit 10. The configuration of the rollers is not to be limited to that shown in the figures, and it is to be appreciated that generally any configuration which allows the continuous track to be mounted and operated for the row unit may be included as part of the invention. Furthermore, it is to be appreciated that the tracks of the row units may be driven in a number of ways. The tracks may simply be driven by the movement of the tractor pulling the planter with the plurality of row units with tracks through the field. In such embodiments, the speed and operation of the tracks will be determined by the tractor itself. Furthermore, it should be appreciated that each row unit includes one or more motors for individually operating the tracks of the row unit 10. The motors or engines, which may be electric, combustion, or other motors, may provide for the individual control of the row units.

The individual control of the speed and operation of the tracks at each row unit may provide additional benefits. The individual control the tracks may aid in turning or other maneuverability of the tracks. For example, if the tracks are being driven by individual motors, one side may be driven at a different speed than the other when the path of the planter is not a straight line. The individual control can aid in pulling the planter through rough terrain, on hills, or the like. For example, when a tractor is going uphill or through otherwise rough terrain, it may require more power to pull a planter. Having the individual control of the tracks of each of the row units will allow the row units to not only be pulled, but instead can aid in driving themselves, which will reduce the amount of power required by the tractor. Still other benefits remain.

Figure 2:
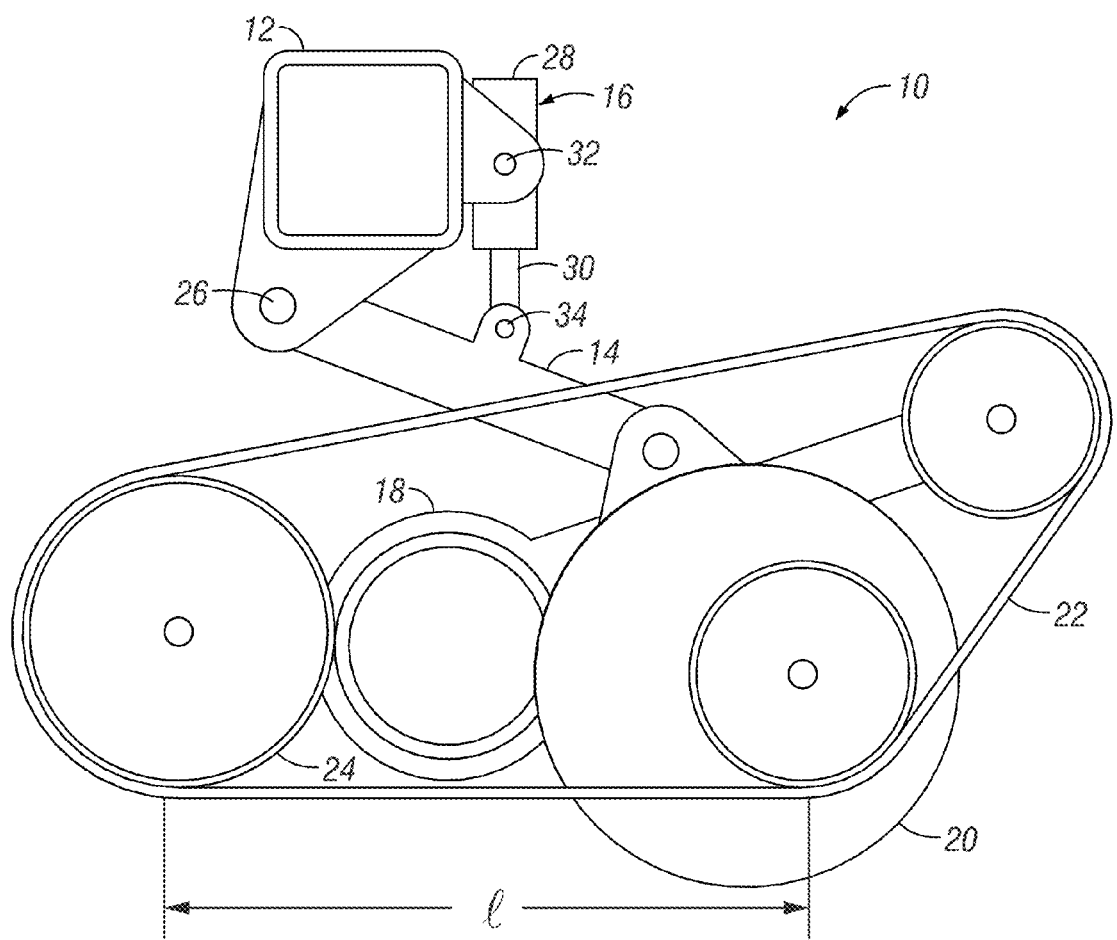
FIG. 2 is a side elevation view of the row unit of FIG. 1.
Figure 3:
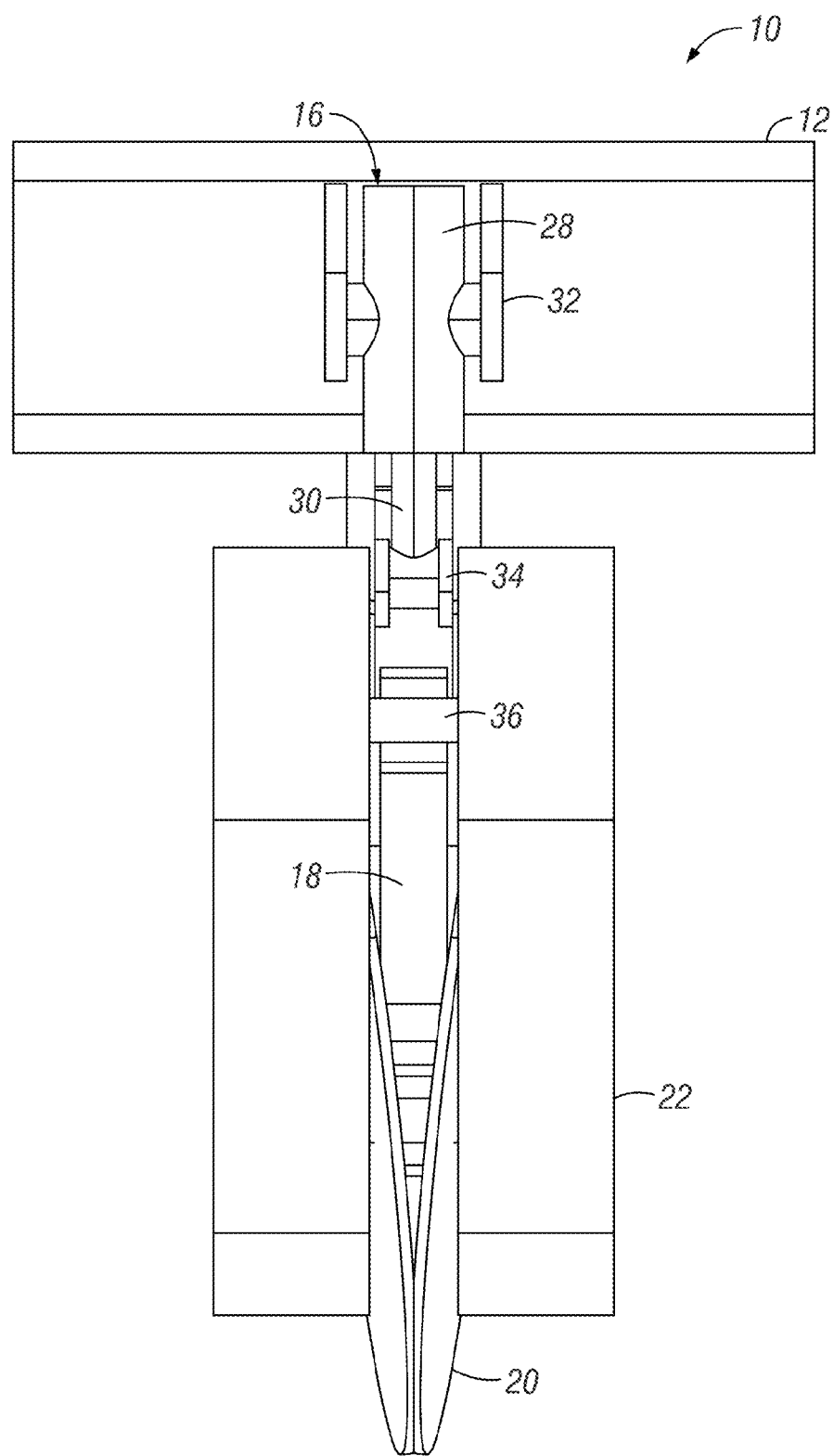
FIG. 3 is a front elevation view of the row unit of FIG. 1.
Figure 4:
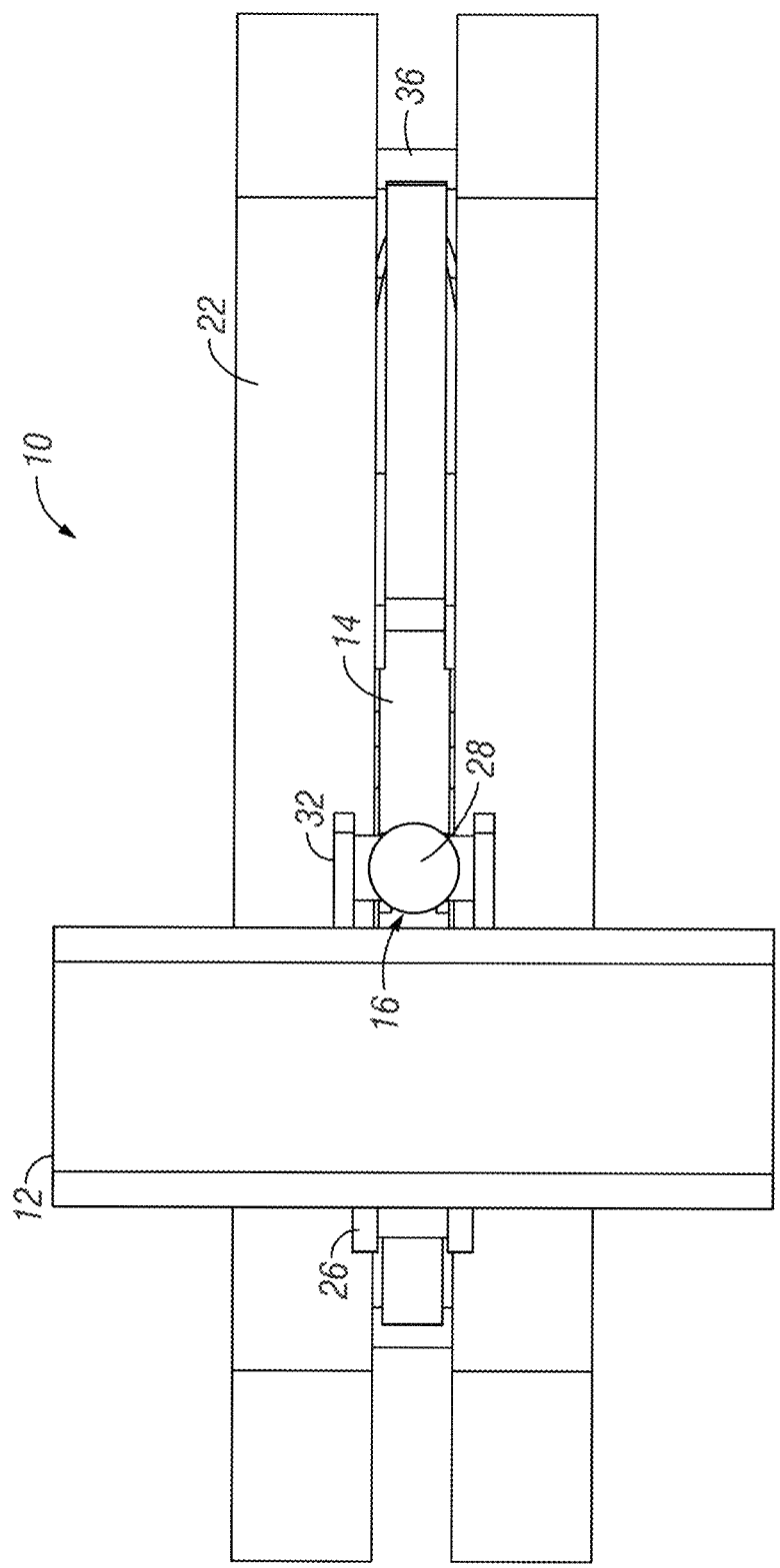
FIG. 4 is a top elevation view of the row unit of FIG. 1.

As shown in the figures, the row unit 10 includes a pair of tracks 22 on opposite sides of the opener disks 20 and seed meter 18. As the row unit 10 does not have traditional closer wheels, the tracks can be positioned on opposite sides of the opener disks 20 and seed meter 18 in order to aid in closing the trench formed thereby. The width of the tracks and the distance between the pair of tracks can be determined to best close the trench after the seed has been deposited therein. Furthermore, as has been discussed, the closing of the trench by the use of the continuous tracks will provide benefits over the use of wheels. As shown in FIG. 5, the tracks have a width "w" and as shown in FIG. 2, will have a length "l" in contact with the ground at a specific moment in time. Utilizing the standard area calculation of width×length, this will provide the amount of surface area in contact with the ground at a specific moment in time. Thus, the weight of the row unit 10 will be spread out over the full area of the two continuous tracks in contact with the ground. This will prevent or alleviate over-compaction of the closing of the trench by the use of the continuous tracks as there is not all the weight or the planter and/or row units at a specific point as there is with wheels. Instead, the continuous tracks will be able to more gently close the trench to cover the seed planted therein. This greater surface area will allow the amount of downforce required by the cylinder 16 to be lesser than has been previously required.

However, with over-applying down pressure, there will not be an increase in compaction, due to the area of the tracks in contact with the ground. The greater surface area will dissipate the compaction of the down pressure.

Figure 7:
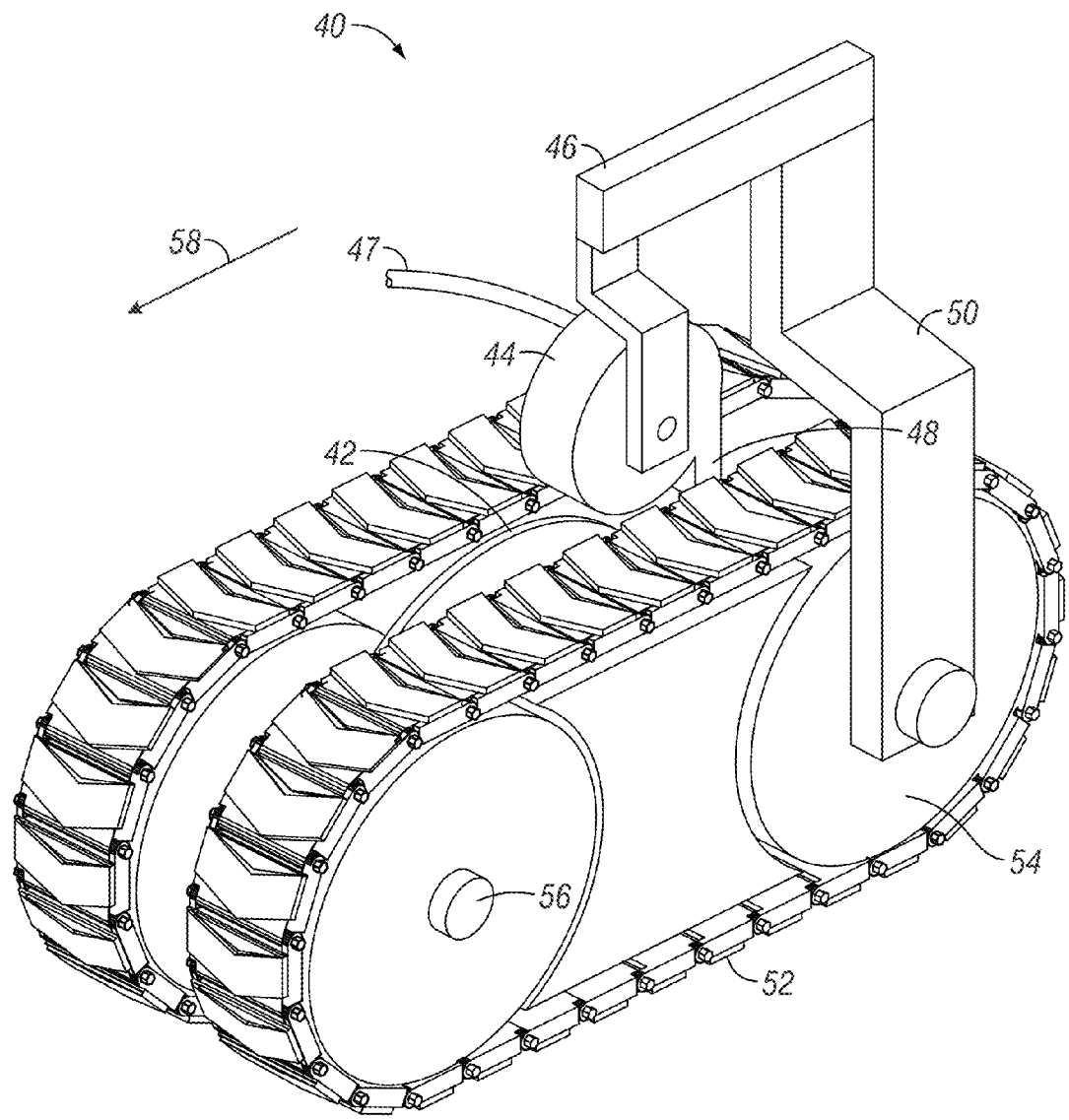
FIG. 7 is a perspective view of another row unit with tracks according to aspects of the invention.
Figure 8:
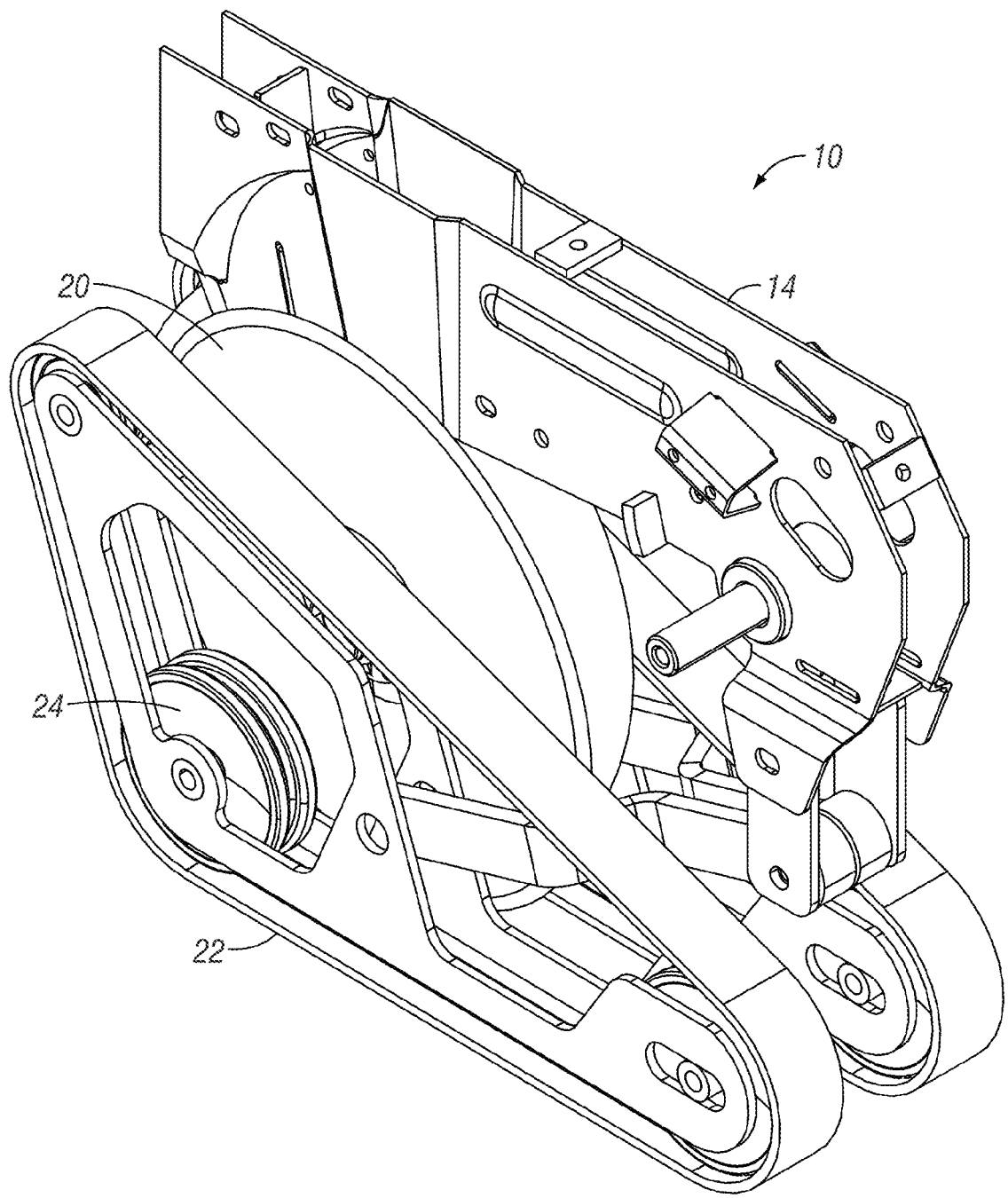
FIG. 8 is a perspective view of another row unit according to aspects of the invention.
Figure 9:
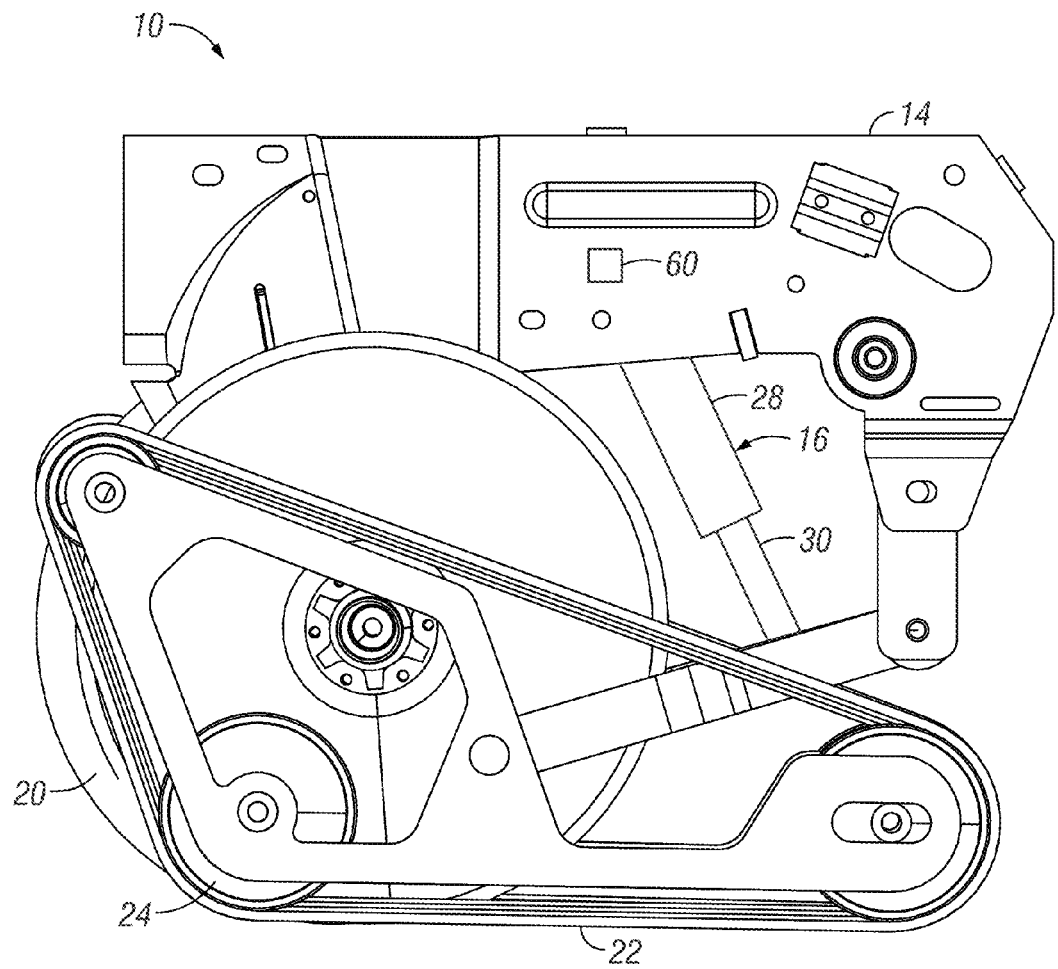
FIG. 9 is a side elevation view of the row unit of FIG. 8.
Figure 10:
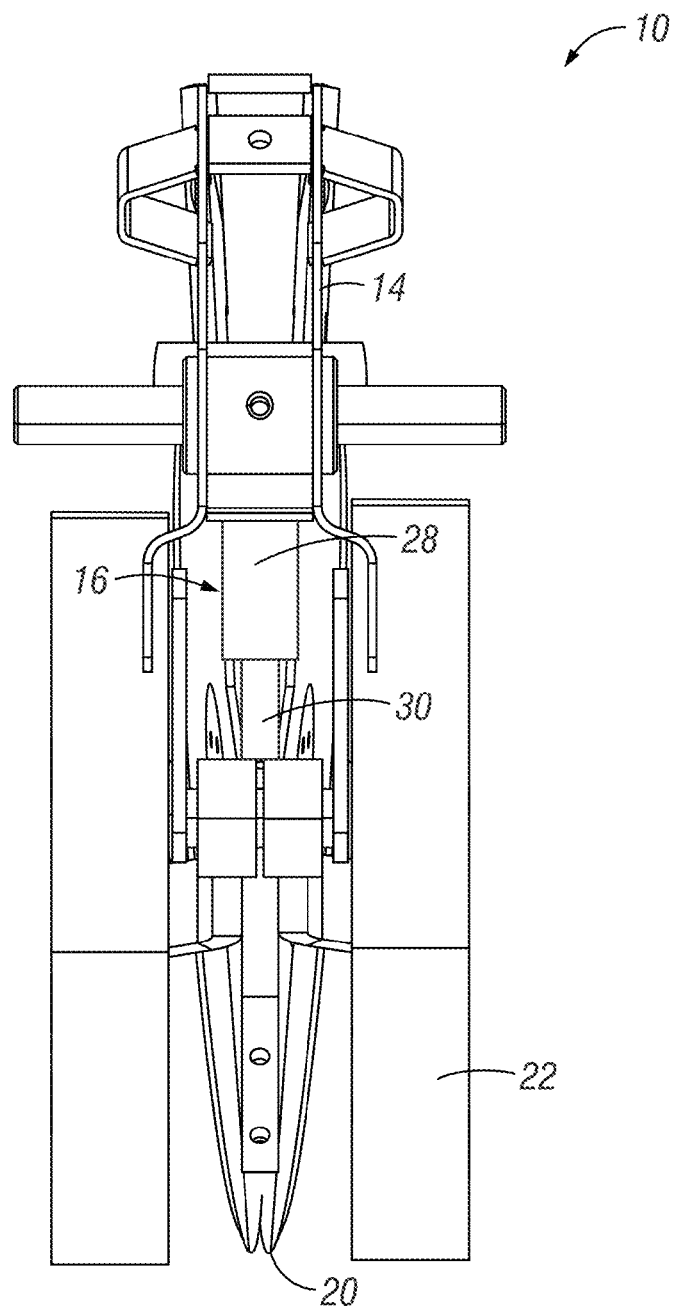
FIG. 10 is a rear elevation view of the row unit of FIG. 8.
Figure 11:
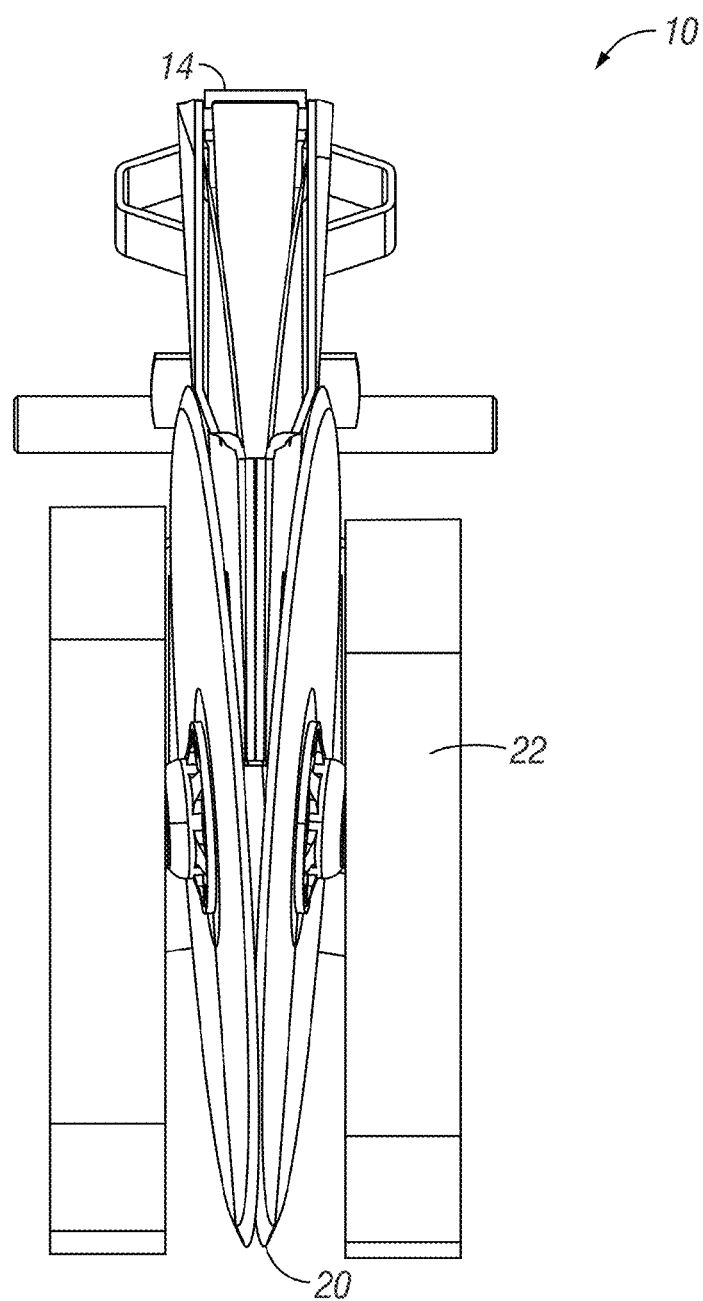
FIG. 11 is a front elevation view of the row unit of FIG. 8.
Figure 12:
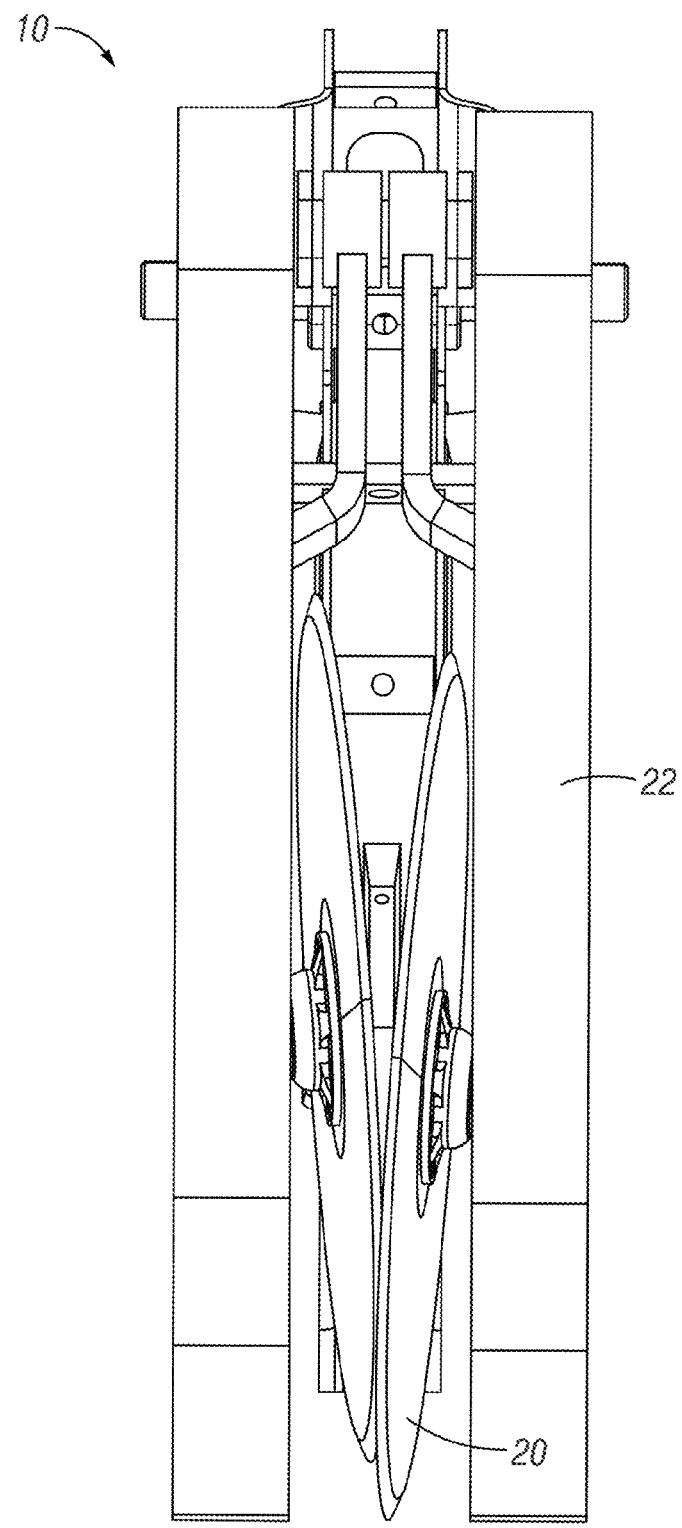
FIG. 12 is a bottom view of the row unit of FIG. 8.

FIG. 7 is another embodiment of a row unit 40 including the use of continuous tracks 52 for the row unit. As with before, the row unit 40 shown in FIG. 7 would be one of a plurality of row units used with a planter (not shown) for planting one or more types of seed. The row unit 40 shown in FIG. 7 includes opener disks 42 positioned between a pair of continuous tracks 52. A seed meter 44 is positioned generally behind the opener disks 42, but in this figure, it is shown to be elevated above the disc opener or opener disks 42. The seed meter 44 is connected to a mount 46, which is connected in turn to a support bracket 50 which is connected to an axle 56 of the rollers 54 of the continuous tracks 52. The direction of travel of the row unit 40 is shown by the arrow 58.

The row unit 40 would be connected to a toolbar of the planter, as previously described. The seed meter would receive seed from a seed source, such as by the air seed delivery hose 47 shown in FIG. 7. The seed meter 44 would be of the configuration previously shown and described. For example, the meter 44 would include a housing with a seed disc and seed singulating device therein. The seed meter would also be an air or mechanical type seed meter, and potentially could be a multi-hybrid type seed meter for planting one of a plurality of types of seed. To account for the varying types of seed meters, the associated components would be included therein. For example, an air hose, such as a vacuum hose or a vacuum itself could be included with the seed meter when the seed meter is a vacuum type seed meter. Furthermore, a seed tube 48 is shown extending from a bottom portion of the seed meter 44 in FIG. 7. The seed tube receives seed released from an aperture of the seed disc in the seed meter, after it has been singulated therein. The seed is then dropped through the seed tube 48 and into the trench created by the disc openers or opener disks 42. The seed tube 48 can be configured to extend generally between or behind the opener discs 42 to position the seed at the optimal depth and with the optimal spacing relative to a seed in front of or behind. The configuration can aid in optimizing seed depth and placement to optimize crop yield.

Furthermore, the row unit 40 includes the use of continuous tracks 52. The tracks are mounted on rollers 54, which may include axles 56 extending therebetween. The axles will aid in providing that the rollers 54, and thus tracks 52 will move at substantially the same speed and/or velocity. The tracks may be of any material capable of providing traction and rolling on the rollers, such as rubber or the like. In addition, as with the row unit 10 previously, the tracks 52 may be driven by the speed of the tractor, or may be independently controlled, such as by the inclusion of one or more motors at each row unit 40.

As shown in FIG. 7, the continuous tracks 52 of the row unit 40 are generally configured such that the rollers are directly in front of and behind one another when on a flat or substantially horizontal surface. This is slightly different than the row unit 10 shown and described previously. Therefore, the invention includes generally any configuration of continuous tracks 52 for use with a row unit of a plurality of row units of a planter.

Thus, row units with continuous tracks replacing wheels have been shown and described herein. As mentioned, the use of continuous tracks is beneficial and otherwise advantageous over the use of wheels for many reasons including, but not limited to, the spreading out of weight per area of the continuous track, the amount of downforce required to maintain the desired depth of an a trench, the greater ability and maneuverability of the row unit, the better control of the row unit in non-optimal conditions, such as rain or mud, and the like. Additional advantages not specifically stated are also to be included. Furthermore, additional aspects and/or embodiments of the invention are considered to be a part of the invention.

For example, in certain embodiments, a designed advantage may be that because tracks are in contact with a larger surface area than a wheel vehicle, they will exert a lower force per area on the ground. Furthermore, while a track rolls or turns with a vehicle, the physical area that contacts the ground, which will be known as the contact area, has no relative velocity or movement with the ground. With tracks, the contact area is larger than with wheels, and the time that a particular point along the track has no relative velocity with the ground is larger than with wheels. Therefore, according to some embodiments of the invention, a sequence of holes may be positioned through and along a rolling continuous track that coincide with desired seed spacing. A seed delivery probe and mechanism can be mounted on the inside of the track and pointed outwardly through the holes. When a portion of the continuous track with a hole and it contacts the ground and thus, there is no relative velocity or movement between the ground and the track, the seed delivery probe including a seed can be extended through said hole and the track and into the ground until it achieves a desired depth at which point the seed will be released from the probe. The probe can then be extracted before the portion of the track loses contact with the ground. For example, before the portion of the hole moves along the path.

Such a seed probe mechanism can be actuated in a number of ways, such as including but not limiting to as a follower with a cam mounted on the moving part of the track, with an electric solenoid, with a hydraulic cylinder, or with a pneumatic cylinder, additional actuations may be provided as well. The probe then is retracted to receive another seed, at which point it is extended through the next hole to plant a seed at said hole, which coincides with the desired spacing between the previous seed. In addition, the probe, while retracting, fills the probe hole by compressing down on the soil around the circumference of the probe and pushing it into the hole. In such a situation, the seed may be metered with a conventional seed meter, but can be mechanically placed into or on the placement probe. Thus, such a situation can be included with a planter having a plurality of row units wherein said probe unit is positioned at each row unit.

Advantages of the system provide that the seed is positioned and placed in the soil by the probe and not dropped from a moving vehicle on a regular terrain, through an irregular shaped tube and into a stationary but irregularly shaped trench, and then moved again from a dirt piling on the open trench. Thus, the use of the probe would increase the efficiency of the seed reaching its desired depth and with the desired spacing between adjacent seeds. Such use of a probe would eliminate many variables that cause issues with planting, such as seed bounce, gravity, irregular terrain, and the like.

Figure 13:
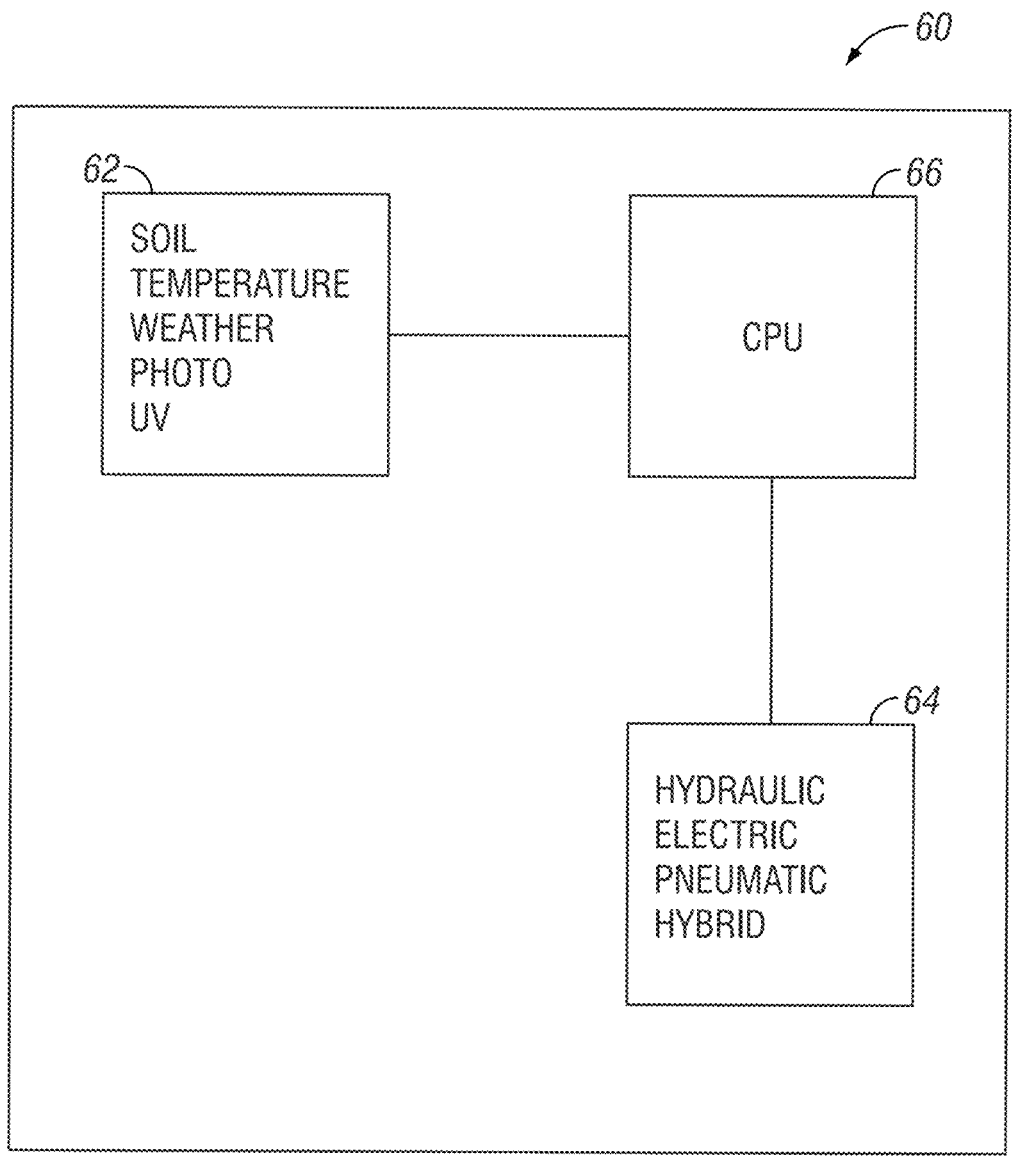
FIG. 13 is a diagram of a downforce system according to aspects of the invention.

FIGS. 8-12 show various views of another row unit incorporating continuous tracks that provides the same benefits and/or advantages as previously shown and described. The row unit is similar to that of FIGS. 1-6, but includes variations that may allow for additional uses, benefits, and/or advantages over that known in the art. For example, additional aspects relating to the depth of the opening disk may be included. The depth could be adjusted manually or automatically, such as by a depth control system 60, as shown in FIG. 13. In an automated system, sensors 62 and actuators 64 could be included with the row unit to determine soil characteristics, seed characteristics, seed type, etc. The data collected by the sensors could determine variations of seed depths that would be optimal for planting. If the depth is needed to be changed, the tracks could be manipulated by the actuators, or the actuators could work directly with the opening disks to adjust the depth of the trench created therein. This could be an open loop system in which the depth change is done by the operator, such as in the cab of the tractor, or it could be a closed loop system in which the depth of the trench is ever-changing based upon changes in the environment of planting. It is also contemplated that some combination thereof be used.

For example, the down force cylinder 16 could be connected to a computing system 66, such as an intelligent control, which is in turn connected to the sensors 62 and/or actuators 64. The sensors 62 could obtain and deliver data to the computing system 66, which determines, based upon inputs and algorithms, whether there needs to be a change in the amount of downforce provided by one or more of the actuators 64 to adjust the depth of the furrow created by the opening wheels or discs 20. The system 60 would ensure a more consistent depth of furrow created even in ever-changing soil characteristics, weather, soil types, and other changes in the field environment.

The invention of a row unit utilizing continuous tracks has hereto for been shown and described. Other aspects obvious to those skilled in the art are to be considered part of the invention. For example, the movement of the seed meter relative to the toolbar and/or opener disks can be varied to account for different types of seed, and the like. Furthermore, aspects can be included, replaced, or moved to account for use for multi-hybrid planting. Furthermore, it should be appreciated that the figures shown and described are for exemplary purposes only, and are not to be considered the entirety of the invention.

What is claimed is:

1. A planter, comprising:
   a toolbar;
   a plurality of row units operatively attached to the toolbar; wherein each of the row units comprise:
   a. opening members for creating an opening in the ground;
   b. a seed meter for dispensing seed adjacent the opening members for dispensing seed into the opening in the ground; and
   c. continuous tracks positioned on opposite sides of the opening members, wherein the tracks will at least partially overlap the opening in the ground created by the opening members to close the opening in the ground created by the opening members at the row unit;
   d. wherein the continuous tracks are configured to aid in moving the planter and closing the opening in the ground after the seed has been dispensed therein.

2. The planter of claim 1, wherein the opening members of the row units are positioned at least partially ahead of the toolbar with regard to the direction of travel of the planter.

3. The planter of claim 1, further comprising a downforce cylinder operatively connecting the toolbar to each of the row units.

4. The planter of claim 3, wherein the downforce cylinder extends between the toolbar and a frame member of the row unit.

5. The planter of claim 4, wherein the downforce cylinder comprises a hydraulic cylinder, pneumatic cylinder, electric actuator, or some combination thereof.

6. The planter of claim 4, wherein the downforce cylinder is a strut.

7. The planter of claim 1, further comprising one or more motors connected to the continuous tracks to drive the continuous tracks.

8. The planter of claim 1, wherein the continuous tracks comprise an elastomeric material.

9. The planter of claim 1, wherein the seed meter is positioned above the continuous tracks.

10. A row unit for use with a planter, comprising:
    opening discs for creating an opening in the ground;
    a seed meter for dispensing seed adjacent the opening discs for dispensing seed into the opening in the ground; and
    continuous tracks positioned on opposite sides of the opening discs, wherein the continuous tracks will at least partially overlap the opening in the ground created by the opening discs;
    wherein the continuous tracks are configured to aid in moving the planter and closing the opening in the ground after the seed has been dispensed therein.

11. The row unit of claim 10, further comprising a downforce cylinder operatively attached to the opening discs to control the depth of furrow created by the opening discs.

12. The row unit of claim 11, further comprising a downforce control system operatively connected to the downforce cylinder to automatically vary the depth of furrow based upon sensed characteristics.

13. The row unit of claim 12, wherein the downforce control system comprises a computing system and one or more sensors electrically coupled to the computing system to provide sensed data thereto.

14. The row unit of claim 13, wherein the one or more sensors sense soil characteristics.

15. The row unit of claim 14, wherein the soil characteristic comprises one of a soil temperature or a soil moisture content.

16. The row unit of claim 15, wherein the downforce cylinder comprises a hydraulic cylinder, pneumatic cylinder, electric actuator, or some combination thereof.

17. The row unit of claim 10, further comprising one or more motors connected to the continuous tracks to drive the continuous tracks.

18. A row unit for use with an agricultural implement, comprising:
    opening discs for creating an opening in the ground;
    a seed meter for dispensing seed adjacent the opening discs for dispensing seed into the opening in the ground;
    a seed tube connected to the seed meter for directing seed from the seed meter to the opening in the ground;
    a seed delivery system operatively connected to the seed meter for providing seed to the seed meter; and
    a continuous track at least partially overlapping the opening in the ground created by the opening discs and configured to aid in moving the agricultural implement and closing the opening in the ground after the seed has been dispensed therein.

19. The row unit of claim 18, further comprising a downforce cylinder operatively connected to the opening discs to control the depth of the opening created by the opening discs.

20. The row unit of claim 18, wherein the seed tube is positioned adjacent the continuous track to dispense seed through a hole in the continuous track.

* * * * *